E. R. ENSIGN.
Land-Marker.
No. 68,424.
Patented Sept. 3, 1867.
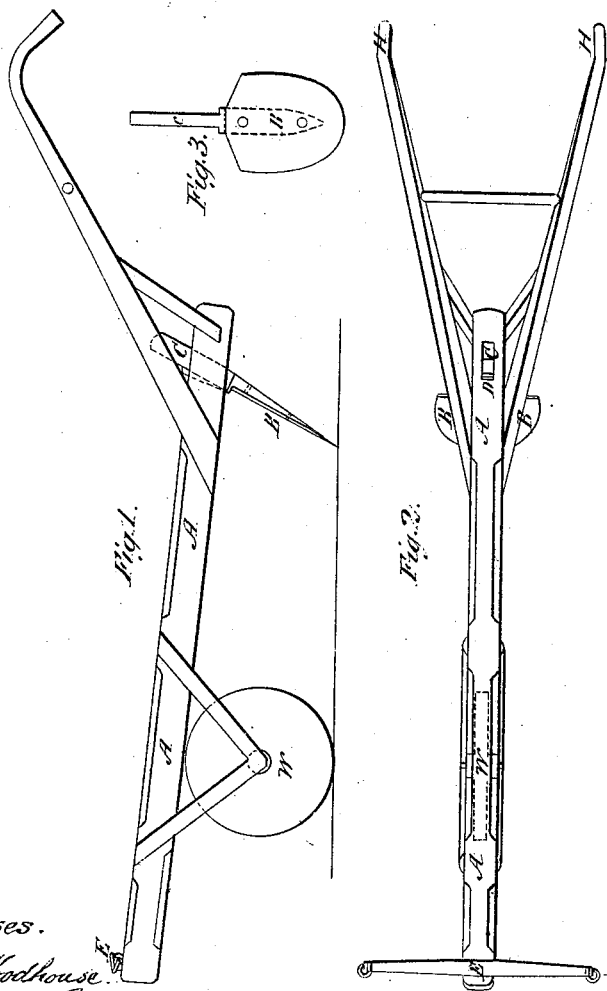

United States Patent Office.

ELIZUR R. ENSIGN, OF EAST HARTFORD, CONNECTICUT.

Letters Patent No. 68,424, dated September 3, 1867.

---

IMPROVEMENT IN MACHINE FOR MAKING HOLES FOR PLANTING.

---

The Schedule referred to in these Letters Patent and making part of the same.

---

TO ALL WHOM IT MAY CONCERN:

Be it known that I, ELIZUR R. ENSIGN, of East Hartford, in the county of Hartford, and State of Connecticut, have invented a new and useful Machine for Making Holes for Planting; and I do hereby declare that the following is a full, clear, and exact description of the same, reference being had to the accompanying drawings and to the letters of reference marked thereon.

Figure 1 shows a side view of the machine.

Figure 2 shows a top view of the same.

Figure 3 shows a front view of the blade detached.

Like letters in the several figures indicate like parts.

A is the beam, to the forward end of which the power is applied to draw the machine. In the drawings a whiffle-tree, E, is shown for attaching a horse. H H are the handles by which the machine is guided and operated. W is a wheel, attached by suitable framework to the under side of the beam A. B is the blade by which the holes are made. It is attached to the beam by the shank C, which passes through a hole or mortise in the beam, and is secured in its position by the wedge D, or any equivalent mechanical device. The wedge can be placed forward or back of the shank C, admitting of some variation of the angle at which the blade B stands with regard to the beam. The blade can also be raised or lowered to any desired position, and then secured by means of the wedge.

The operation of my invention is as follows: The power by which the machine is drawn being applied to the forward end of the beam, a man follows behind, taking hold of the handles H H to guide and operate it. The wheel W rolls upon the surface of the ground. When it is desired to make a hole the handles are depressed, by which the point of the blade is forced into the ground to the desired depth, the entrance into the soil being facilitated by the angle at which the blade stands to the surface of the ground. When the blade has entered to the desired depth the pressure upon the handles is removed, when the action of the power drawing upon the forward end of the beam, with the wheel W acting as a fulcrum, lifts out the earth from the hole. This operation is also assisted by the raising of the handles H H. The blade then passes over the surface of the ground, held up by the handles, the machine rolling on the wheel W like an ordinary wheel-barrow, until the position for the next hole is reached, when the already-described operation is repeated.

*Claim.*

What I claim as my invention, and desire to secure by Letters Patent, is—

The combination of the blade B with the beam A, the handles H H, and the wheel W, substantially as specified, the whole forming a machine for making holes for planting as herein described.

ELIZUR R. ENSIGN.

Witnesses:
LEVI WOODHOUSE,
THEO. G. ELLIS.